United States Patent
Kanagawa et al.

(10) Patent No.: US 6,923,373 B2
(45) Date of Patent: Aug. 2, 2005

(54) DEVICE WITH MEMORY CARD INSERTION/REMOVING MECHANISM

(75) Inventors: Kiyoshi Kanagawa, Yokohama (JP); Masanobu Okada, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/846,539

(22) Filed: May 17, 2004

(65) Prior Publication Data

US 2004/0238633 A1 Dec. 2, 2004

(30) Foreign Application Priority Data

May 28, 2003 (JP) ........................................ 2003-151176
Feb. 20, 2004 (JP) ........................................ 2004-044933

(51) Int. Cl.[7] ................................................ G06K 7/08
(52) U.S. Cl. ........................ 235/451; 235/486; 235/441
(58) Field of Search ................................ 235/451, 486, 235/375, 441, 380; 710/301

(56) References Cited

U.S. PATENT DOCUMENTS

| | | | | |
|---|---|---|---|---|
| 5,895,903 A | * | 4/1999 | Abe et al. | 235/380 |
| 6,006,987 A | * | 12/1999 | Hoolhorst | 235/375 |
| 6,295,031 B1 | * | 9/2001 | Wallace et al. | 343/702 |
| 6,550,684 B1 | * | 4/2003 | Zuin et al. | 235/486 |
| 6,592,041 B1 | * | 7/2003 | Hanzawa | 235/486 |
| 6,769,603 B2 | * | 8/2004 | Nagai et al. | 235/375 |
| 2003/0150914 A1 | * | 8/2003 | Shin | 235/441 |
| 2004/0039860 A1 | * | 2/2004 | Mills et al. | 710/301 |

FOREIGN PATENT DOCUMENTS

| | | |
|---|---|---|
| JP | 09-017493 | 1/1997 |
| JP | 10-162894 | 6/1998 |
| JP | 2001-076101 | 3/2001 |

* cited by examiner

*Primary Examiner*—Jared J. Fureman
*Assistant Examiner*—Allyson N Trail
(74) *Attorney, Agent, or Firm*—Keating & Bennett, LLP

(57) ABSTRACT

A device with a memory card insertion/removing mechanism has a memory card holder and a pushing-out member holder disposed in the device, and a slot communicating with the memory card holder. The pushing-out member holder communicates with the memory card holder. A pushing-out member is accommodated in the pushing-out member holder. The device has an opening exposing a portion of the pushing-out member to the exterior. The pushing-out member moves in a card insertion direction by the pushing force of a memory card when the memory card is inserted in the memory card holder from the slot, and pushes out the memory card in the memory card holder to the exterior when the pushing-out member is externally operated through the opening and is moved in a card push-out direction.

28 Claims, 16 Drawing Sheets

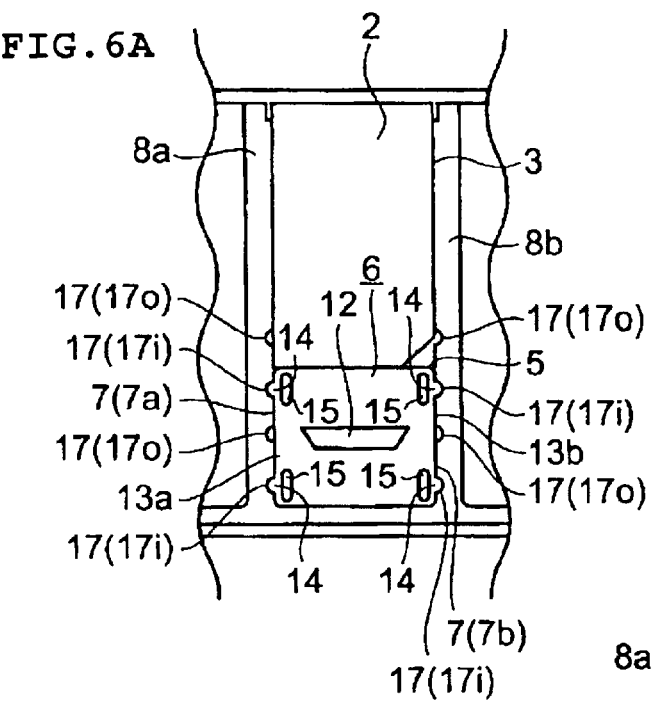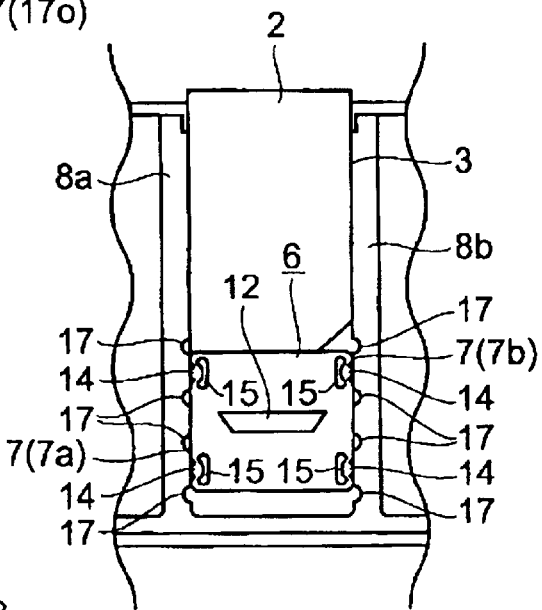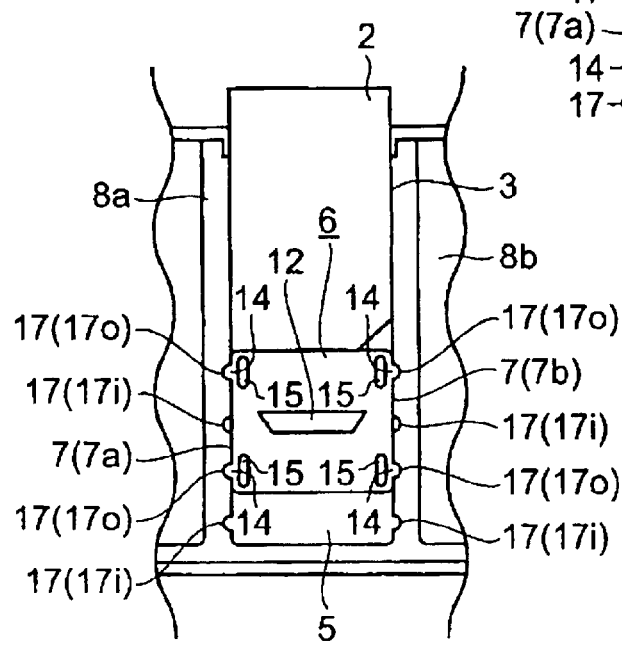

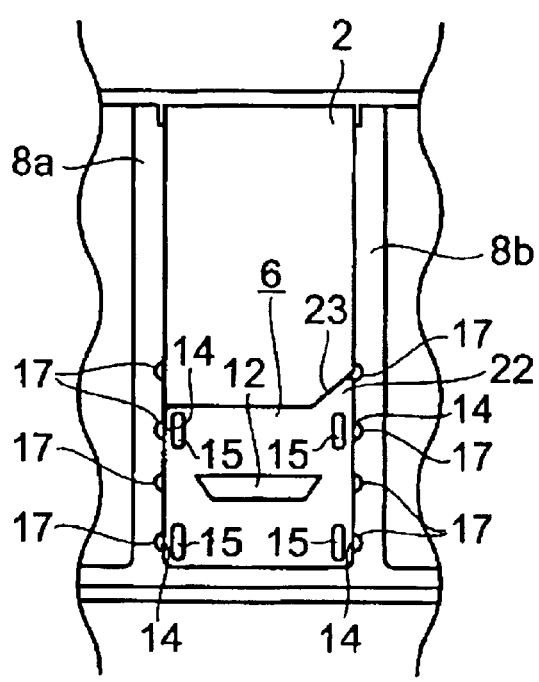
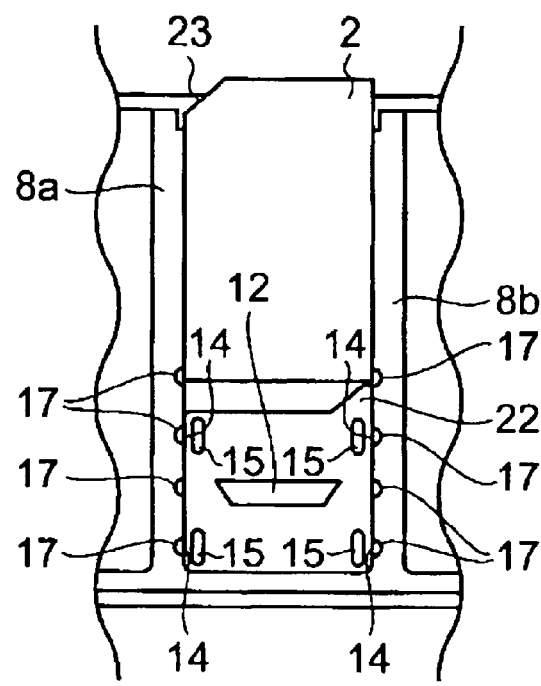

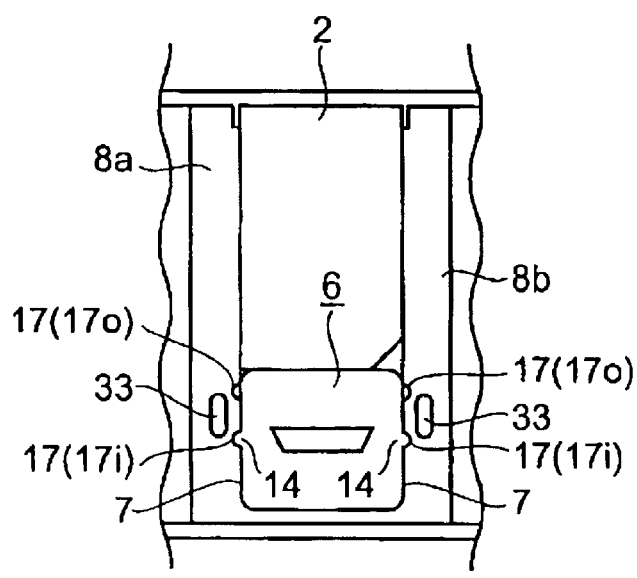
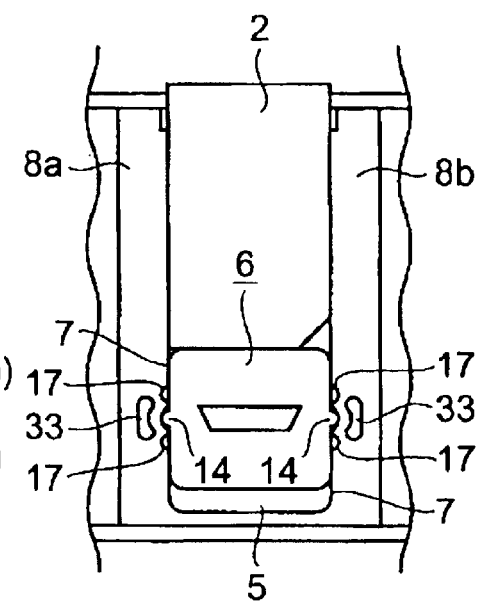

DEVICE WITH MEMORY CARD INSERTION/REMOVING MECHANISM

BACKGROUND OF THE INVENTION

1. Field of the Invention

The present invention relates to a device including a mechanism capable of removably accommodating a memory card.

2. Description of the Related Art

FIG. 16 shows in simplified form an example of a device with a memory card insertion/removing mechanism (refer to, for example, Japanese Unexamined Patent Application Publication No. 9-17493). A device 40 can removably accommodate a memory card 41, and has a memory card holder 42 and a card insertion unit 43. The memory card 41 is slidingly fitted and inserted into the card insertion unit 43. The card insertion unit 43 is mounted to walls of the memory card holder 42 so as to be rotatable in the directions of a double-headed arrow Tr shown in FIG. 16.

When the memory card 41 is to be inserted into the device 40, for example, the memory card 41 is slidingly fitted and inserted into the card insertion unit 43 that is raised as shown in FIG. 16. Then, the card insertion unit 43 is rotated in the direction in which it is tilted downward, and is accommodated in the memory card holder 42. Thereafter, the memory card holder 42 is covered by a cover (not shown), and is sealed. This completes the insertion of the memory card 41 into the device 40.

When the memory card 41 is to be removed from the device 40, the aforementioned steps are carried out in the reverse order. That is, first, the cover is removed from the memory card holder 42, and the card insertion unit 43 in the memory card holder 42 is rotated in the direction in which the card insertion unit 43 is raised. Then, the memory card 41 is removed from the card insertion unit 43. In this way, the memory card 41 can be removed from the device 40.

In addition to the aforementioned Japanese Unexamined Patent Application Publication No. 9-17493, refer to Japanese Patent No. 3120043 (Japanese Unexamined Patent Application Publication No. 10-162894) and Japanese Unexamined Patent Application Publication No. 2001-76101.

In the memory card 41 insertion/removing mechanism, when the memory card 41 is inserted or removed, it is necessary to rotate the card insertion unit 43 and to place the cover onto or remove the cover from the memory card holder 42. Therefore, it is troublesome to insert and remove the memory card 41.

Memory insertion/removing mechanisms having various structures other than the above-described structure have been proposed. However, the various structures that have been proposed previously are unsatisfactory structures because, for example, they are complicated and tend to malfunction, and cannot be easily reduced in cost due the large number of parts.

SUMMARY OF THE INVENTION

In order to overcome the problems described above, preferred embodiments of the present invention provide a device with a memory card insertion/removing mechanism having a simple structure and allowing easy insertion and removal of a memory card.

According to a preferred embodiment of the present invention, a device with a memory card insertion/removing mechanism includes a memory card holder for accommodating a memory card through a slot communicating with the memory card holder, a pushing-out member accommodated in a pushing-out member holder and movable in a card insertion direction and a card removing direction along a first guide defined by the pushing-out member holder, the pushing-out member holder communicating with a back side, as viewed in the card insertion direction, of the memory card holder, and an operation opening exposing a portion of the pushing-out member to the exterior of the device. In the device, the pushing-out member is moved in the card insertion direction by the pushing force of the memory card when the memory card is inserted, and pushes out the memory card accommodated in the memory card holder by external operation through the operation opening. The memory card holder functions as a second guide for guiding the memory card such that one of two surfaces of the memory card holder is facing at least one of two surfaces of the memory card. The first guide has a top surface and a bottom surface and side surfaces therebetween, one of the top and bottom surfaces being disposed continuously and flush with one of the two surfaces of the second guide, the side surfaces guiding sides of the pushing-out member.

The device with the memory card insertion/removing mechanism of various preferred embodiments of the present invention is constructed so that the memory card can be accommodated in the memory card holder by inserting the memory card into the memory card holder from the slot, and can be removed from the device by pushing out the memory card from the memory card holder by the pushing-out member. In other words, it is constructed so that the insertion and removal of the memory card can be carried out by very simple operations.

In a preferred embodiment of the present invention, the device with the memory card insertion/removing mechanism is constructed so that the pushing-out member can be directly operated through an operation opening which exposes a portion of the pushing-out member to the exterior of the device. Therefore, the memory card insertion/removing mechanism in the present invention does not require a complicated structure including, for example, a spring for moving the pushing-out member, so that it has a very simple structure. Consequently, it is possible to simplify the structure of the device and to reduce the number of parts, thereby making it possible to reduce the cost of the device. Further, it is possible to reduce the probability of failure of the memory card insertion/removing mechanism of the device, so that the durability of the device can be ensured.

When the memory card is inserted to a predetermined accommodation position, or when it is pushed out to a predetermined pushed-out position, a structure in which a fitting portion of the pushing-out member and a fitting portion of a side surface of the first guide or pushing-out member holder are fitted together makes the following possible. For example, when the memory card is pushed out to the predetermined pushed-out position by the pushing-out member, the fitting portion of the pushing-out member and that of the side surface of the first guide are fitted together. This generates, for example, a click, and stops the pushing-out member, so that, for example, a tactile feel is transmitted from the pushing-out member to an operator, thereby making it possible to notify the operator that the pushing out of the memory card is completed. Similarly, when the memory card is inserted to the predetermined accommodation position, the fitting portion of the pushing-out member and that of the side surface of the first guide are fitted together.

This generates, for example, a click, and stops the pushing-out member, so that, for example, a tactile feel is transmitted from the pushing-out member to the operator, thereby making it possible to notify the operator that the insertion of the memory card is completed.

In addition, when a structure including fitting portions for fitting together the pushing-out member and the side surface of the first guide are provided, in order to overcome the problem that the pushing-out member cannot move smoothly due to the fitting portions, a flexible portion may be disposed at the side surface of the first guide or at a side of the pushing-out member facing the side surface of the first guide in preferred embodiments of the present invention. This makes it possible to smoothly move the pushing-out member by guiding it by the side surface of the first guide while deforming the flexible portion by pushing force produced by the fitting portion. In other words, it is possible to easily move the pushing-out member without exerting undue force on the pushing-out member.

Further, the slot may have a similar size as an end of the memory card, and the operation opening for externally operating the pushing-out member exposes a portion of the pushing-out member to the exterior of the device. Therefore, it is possible to reduce the areas of the entire device that the slot and the operation opening occupy. This makes it possible to prevent a reduction in the strength of the device caused by the openings, so that the strength of the device can be ensured.

When either one or both of a protrusion and a recess for pushing out the memory card are disposed at a side of the pushing-out member exposed to the exterior from the operation opening for the pushing-out member, the pushing-out member can be more easily operated.

When a cutout is disposed at an insertion end of the memory card, a protrusion which fits the cutout of the memory card is disposed on a portion of the pushing-out member that comes into contact with the memory card. Therefore, when, for example, the wrong side of the memory card is inserted by mistake, the end of the memory card contacts an end of the protrusion of the pushing-out member, thereby preventing the memory card from being inserted to the set accommodation position. Consequently, any person who has inserted the memory card can realize whether or not he/she has inserted the wrong side of the memory card. If the wrong side is inserted, he/she re-inserts the correct side of the memory card, and properly accommodates the memory card in the memory card holder of the device.

In preferred embodiments of the present invention, the memory card insertion/removing mechanism is a distinctive mechanism having a simple structure, so that it can be installed in a card device without increasing the size of the card device. Therefore, preferred embodiments of the present invention are very effective in providing a small, thin card device.

Other features, elements, characteristics and advantages of the present invention will become more apparent from the following detailed description of preferred embodiments thereof with reference to the attached drawings.

BRIEF DESCRIPTION OF THE DRAWINGS

FIGS. 6A to 6C illustrate an example of a state in which the pushing-out member moves while being guided along side surfaces of a pushing-out member holder;

FIGS. 8A and 8B illustrate another example of the pushing-out member;

FIGS. 12A and 12B illustrate an example in which flexible portions are formed at the side surfaces of the first guide or pushing-out member holder whose fitting portions are recesses;

DETAILED DESCRIPTION OF PREFERRED EMBODIMENTS

Preferred embodiments of the present invention will now be described with reference to the drawings.

A device with a memory card insertion/removing mechanism according to a preferred embodiment of the present invention will be described, taking as an example a CompactFlash® (CF) card device capable of removably accommodating a subscriber-identity-module (SIM) card which is a memory card.

Figure 1A:
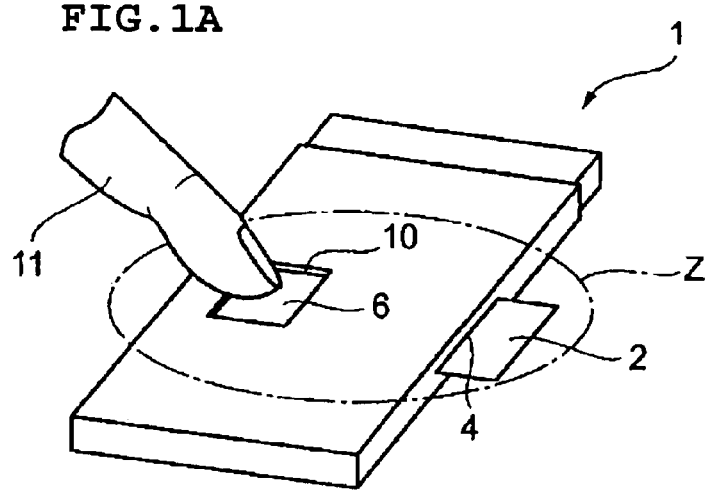
FIGS. 1A to 1C illustrate a preferred embodiment of a device with a memory card insertion/removing mechanism of the present invention.
Figure 1B:
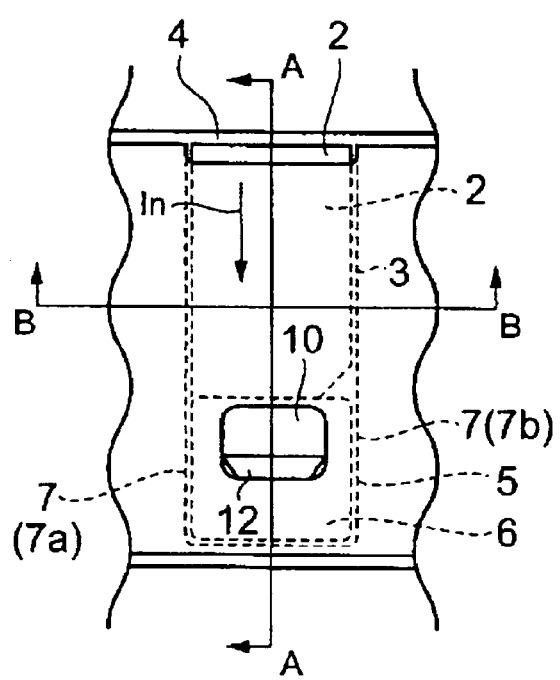
Figure 1C:
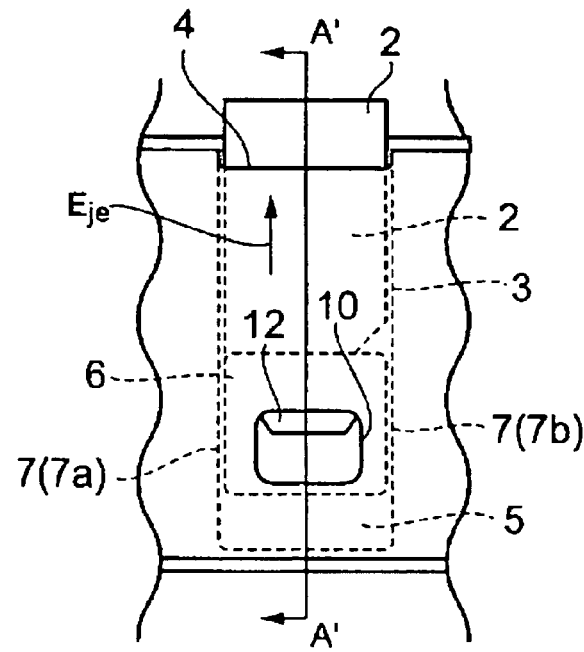
Figure 2A:
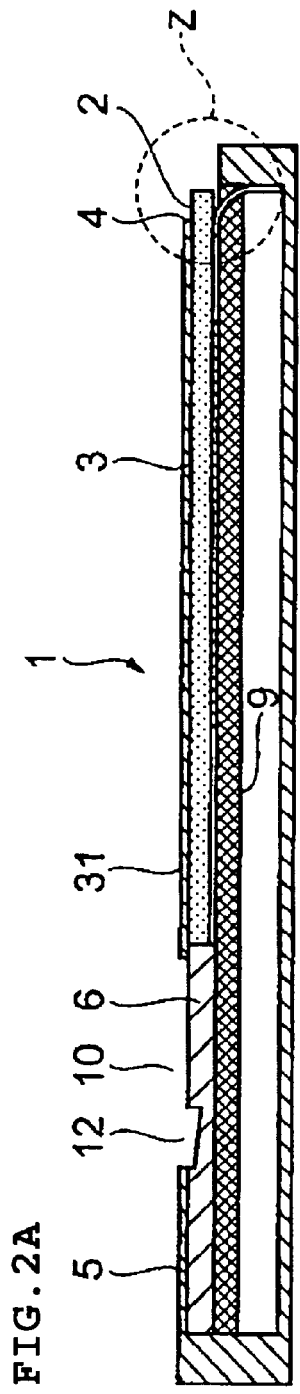
FIGS. 2A to 2C are sectional views of the device with the memory card insertion/removing mechanism shown in FIGS. 1A to 1C.
Figure 2B:
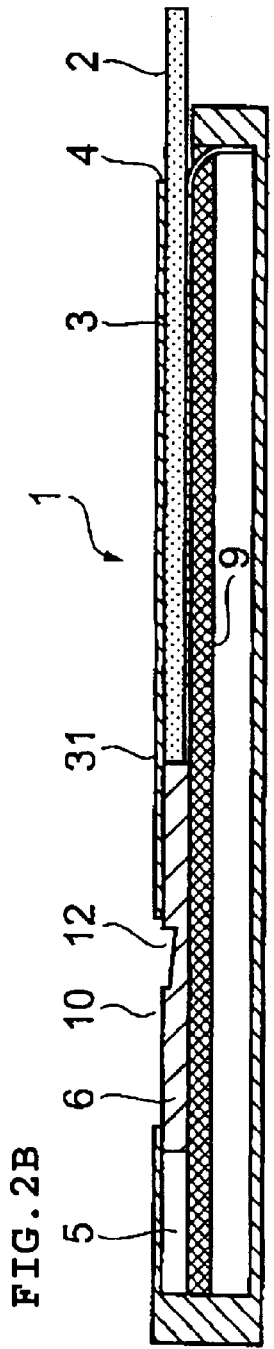
Figure 2C:
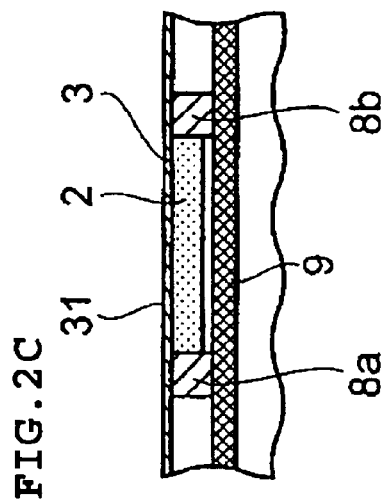

FIG. 1A is a perspective view showing in simplified form a CF card device corresponding to the device with the memory card insertion/removing mechanism of the present preferred embodiment. FIGS. 1B and 1C are schematic top views of a portion of the CF card device enclosed by a dot-dash circle Z shown in FIG. 1A. FIG. 2A is a sectional view taken along line A—A of FIG. 1B, FIG. 2B is a sectional view taken along line A'—A' of FIGS. 1C, and FIG. 2C is a sectional view taken along line B—B of FIG. 1B.

Figure 3:
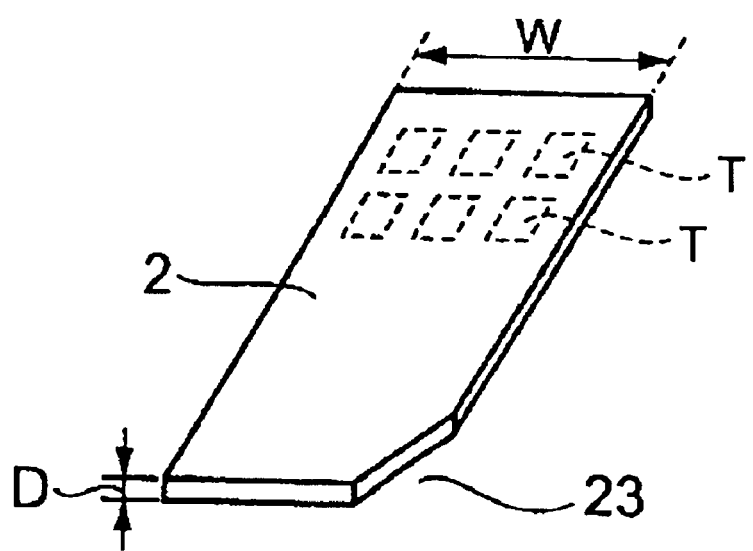
FIG. 3 is a perspective view of an example of a memory card.

A memory card holder 3 for accommodating a SIM card 2 such as that shown in FIG. 3 is provided in the CF card device 1 of the present preferred embodiment. As shown in FIG. 2C, the memory card holder 3 is defined by a front case wall 31, a circuit board 9, and rails 8a and 8b of the CF card device 1. The circuit board 9 is accommodated in the CF card device 1. The rails 8a and 8b are disposed substantially parallel to each other between the front case wall 31 and the circuit board 9. The SIM card 2 is accommodated in the memory card holder 3 so that its front faces the front case wall 31 and its back faces a surface of the circuit board 9.

A slot 4 communicating with the memory card holder 3 is formed in a side portion of the CF card device 1. In the present preferred embodiment, the width of the memory card holder 3 and that of the slot 4 are substantially the same as a width W of the SIM card 2. The height of the memory card holder 3 and that of the slot 4 are substantially the same as a thickness D of the SIM card 2.

The SIM card 2 is inserted into the memory card holder 3 from the slot 4. Both sides of the SIM card 2 are guided along side surfaces (that is, the rails 8a and 8b) of the memory card holder 3, the front of the SIM card 2 is guided along the front case wall 31 of the CF card device 1, and the back of the SIM card 2 is guided along the circuit board 9, so that the SIM card 2 is slidingly inserted in the direction of arrow In (card insertion direction) shown in FIG. 1B, and is removably accommodated in the memory card holder 3. In other words, in the present preferred embodiment, a portion of the front card wall 31 functions as a card guide for guiding the front of the SIM card (memory card) 2, and a portion of the circuit board 9 functions as a card guide for guiding the back of the SIM card 2.

Figure 4:
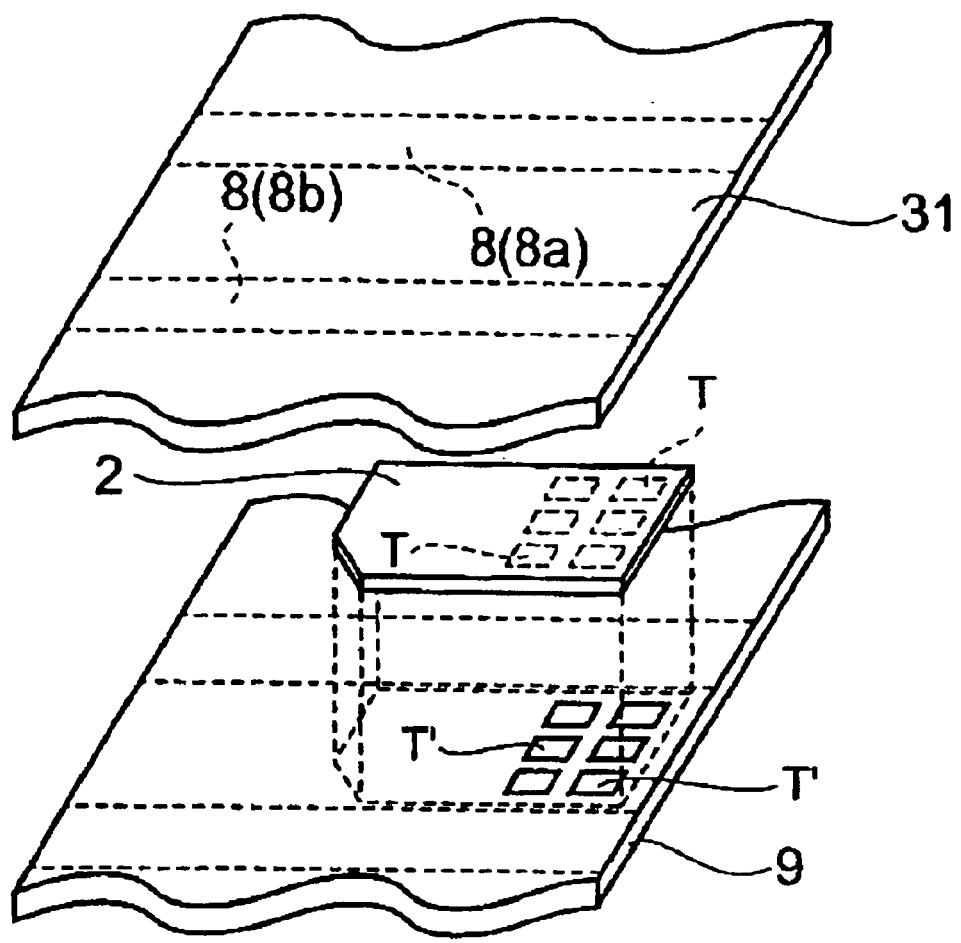
FIG. 4 illustrates an electrical connection structure of the memory card and the device with the memory card insertion/removing mechanism.

The SIM card 2 is a surface-contact type card. Metal terminals T for electrically connecting the SIM card 2 to an external device are provided on a surface of the SIM card 2 (in the example shown in FIG. 3, they are provided on the back of the SIM card 2). As shown in the exploded schematic view of FIG. 4, connection terminals T' for contacting the metal terminals T on the SIM card 2 are provided on a portion of the circuit board 9 facing the metal terminals T on the SIM card 2 when the SIM card 2 is accommodated in the memory card holder 3.

An internal circuit of the SIM card 2 can be brought into electrical conduction with a circuit provided on the circuit board 9 through the metal terminals T on the SIM card 2 and the connection terminals T' on the circuit board 9 of the CF card device 1. The CF card device 1 is removably accommodated in a slot of an electronic apparatus, such as a personal computer. An external connection terminal (not shown) for electrical connection with the electronic apparatus is disposed in the CF card device 1. The internal circuit of the SIM card 2 can be brought into electrical conduction with the electronic apparatus through the connection terminals T', the circuit on the circuit board 9, and the external connection terminal of the CF card device 1. In the present preferred embodiment, the connection terminals T' on the circuit board 9 are not exposed to the exterior, so that it is possible to reduce the occurrence of damage to the connection terminals T', and to prevent shorts between the connection terminals T' caused by, for example, adhesion of dirt.

In the above described preferred embodiments, a pushing-out member holder 5 communicates with a back side (as viewed in the direction in which the memory card is inserted) of the memory card holder 3. Like the memory card holder 3, the pushing-out member holder 5 is defined by the front case wall 31, the circuit board 9, and the rails 8a and 8b of the CF card device 1. The width and height of the pushing-out member holder 5 are substantially the same as the width and height of the memory card holder 3, respectively.

Figure 5:
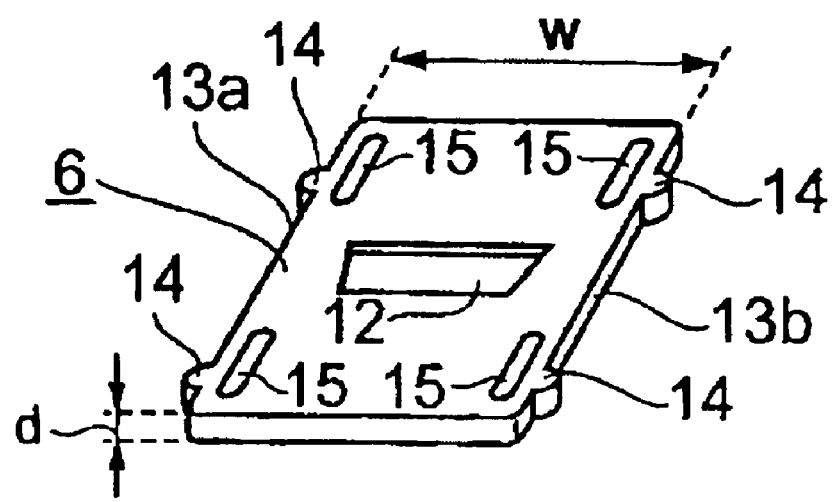
FIG. 5 illustrates an example of a pushing-out member.

A pushing-out member 6, such as that shown in FIG. 5, is disposed in the pushing-out member holder 5. In the present preferred embodiment, a width w of the pushing-out member 6 is substantially the same as the width W of the SIM card 2. In addition, a thickness d of the pushing-out member 6 is substantially the same as the thickness D of the SIM card 2. In other words, the width w of the pushing-out member 6 is substantially the same as the width of the pushing-out member holder 5, and the thickness d of the pushing-out member 6 is substantially the same as the height of the pushing-out member holder 5.

The pushing-out member 6 is slidable in the insertion direction and removing direction of the card while being guided along portions of the front case wall 31, the circuit board 9, and the rails 8a and 8b including the pushing-out member holder 5. In other words, in the present preferred embodiment, the portion of the front case wall 31 defining the pushing-out member holder 5 is formed continuously and is flush with the card guide of the memory card holder 3 (that is, the portion of the front case wall 31 defining the memory card holder), and defines a top surface for guiding the front of the pushing-out member 6. In addition, the portion of the circuit board 9 defining the pushing-out member holder is formed continuously and is flush with the card guide of the memory card holder 3 (that is, the portion of the circuit board 9 defining the memory card holder), and defines a bottom surface for guiding the back of the pushing-out member 6. Further, portions 7 (7a and 7b) of the respective rails 8a and 8b defining the pushing-out member holder 5 define side surfaces for guiding the sides of the pushing-out member 6.

The front case wall 31 of the CF card device 1 has an opening 10 exposing a portion of a surface of the pushing-out member 6 to the exterior. As shown in FIG. 1A, an operator can operate the pushing-out member 6 with, for example, his/her finger 11 through the opening 10. In other words, the opening 10 allows the pushing-out member 6 to be externally operated. In the present preferred embodiment, in order to facilitate the operation of the pushing-out member 6, a recess 12 functioning as an operation portion of the pushing-out member 6 is provided in the portion of the surface of the pushing-out member 6 exposed from the operation opening 10 (see FIGS. 2A and 2B).

When the SIM card 2 is inserted into the memory card holder 3, as shown in FIG. 1B, the pushing-out member 6 is pushed by the SIM card 2 and slid in the card insertion direction In. When the pushing-out member 6 is externally operated through the operation opening 10, and is slid in the direction of arrow (SIM card push-out direction) Eje shown in FIG. 1C, it pushes the SIM card 2, and pushes it out from the memory card holder 3.

In this preferred embodiment, the pushing-out member 6 and the side surfaces 7 of the pushing-out member holder 5 have the following distinctive structures. More specifically, fitting portions or protrusions 14 are disposed on sides 13a and 13b of the pushing-out member 6 facing the side surfaces 7 (7a and 7b) (see FIG. 5). Through holes 15 passing through the pushing-out member 6 from the front to the back sides are disposed in portions of the pushing-out member near the fitting portions 14. By the through holes 15, the fitting portion 14 shapes into a beam the both sides of that is integrated with the pushing-out member 6.

For example, as shown in FIG. 6A, fitting portions (recesses) 17 (17o and 17i) which fit the fitting portions (protrusions) 14 of the pushing-out member 6 are provided in the side surfaces 7 (7a and 7b) of the pushing-out member holder 5. In the present preferred embodiment, the fitting portions 17i are formed at locations that allow them to receive the fitting portions 14 of the pushing-out member 6 when the SIM card 2 is inserted to a predetermined accommodation position. As shown in FIG. 6C, the fitting portions 17o are formed at locations that allow them to receive the fitting portions 14 of the pushing-out member 6 when the SIM card 2 is pushed out to a predetermined pushed-out position.

In the present preferred embodiment, by the pushing-out member 6 and the side surfaces 7 having the above-described distinctive structures, the pushing-out member 6 is brought into the following states when it slides. For example, when the SIM card 2 is accommodated in the memory card holder 3, and the pushing-out member 6 is disposed at a set accommodation position (see FIG. 6A), application of a force to the pushing-out member 6 in the SIM card push-out direction Eje through the operation opening 10 causes a pushing force to be applied to the fitting portions 14 of the pushing-out member 6 from the side surfaces 7.

In this preferred embodiment, since the through holes 15 are formed near the fitting portions 14, the pushing force from the side surfaces 7 causes the sides where the fitting portions 14 are formed to be deformed, so that the fitting portions 14 are pushed towards the through holes 15. This causes the fitting portions 14 of the pushing-out member 6 to move out of the fitting portions 17i of the side surfaces 7, so that the pushing-out member 6 starts to slide in the SIM card push-out direction Eje. As shown in FIG. 6B, while the sides where the fitting portions 14 of the pushing-out member 6 are formed are being deformed by the pushing force from the side surfaces 7, the pushing-out member 6 is slid by externally operating it through the operation opening 10. In other words, in the present preferred embodiment, the sides of the pushing-out member 6 where the fitting portions 14 provided are flexible portions.

Thereafter, when the pushing-out member 6 is slid to the set pushed-out position, as shown in FIG. 6C, the fitting portions 14 of the pushing-out member 6 are fitted to the fitting portions 17o of the side surfaces 7. This causes a click to be generated, and the pushing-out member 6 to stop sliding, so that, for example, a tactile feel is applied to the operator outside the pushing-out member 6. Accordingly, the pushing out of the SIM card 2 by the pushing-out member 6 is completed. When the SIM card 2 is pushed out in this way, the operator holds, for example, a portion of the SIM card 2 protruding from the CF card device 1 with his/her fingers and pulls it out.

When the SIM card 2 is inserted into the memory card holder 3, a pushing force from the SIM card 2 causes the pushing-out member 6 to start sliding from, for example, the state shown in FIG. 6C. Then, as shown in FIG. 6B, the sides of the pushing-out member 6 where the fitting portions 14 are provided are guided along the side surfaces 7 and are slid while being deformed by a pushing force from the side surfaces 7.

Then, when the pushing member 6 is moved to the set accommodation position, the fitting portions 14 of the pushing-out member 6 are fitted to the fitting portions 17i of the side surfaces 7 with a clicking sound, so that the pushing-out member 6 stops sliding. Accordingly, the insertion of the SIM card 2 is completed.

Entry of dirt into the memory card holder 3 may prevent the metal terminals T on the SIM card 2 and the connection terminals T' of the CF card device 1 from contacting and being connected to each other. Therefore, in the present preferred embodiment, a structure such as that described below is used to prevent the entry of dirt into the memory card holder 3.

Figure 7A:
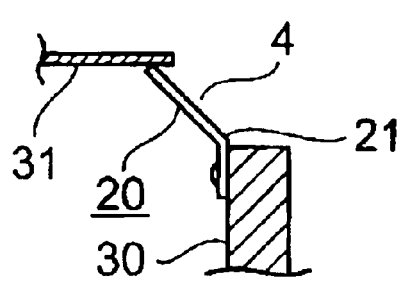
FIGS. 7A and 7B illustrate a structural example of a slot.

FIG. 7A shows the portion enclosed by the dot-dash circle Z shown in FIG. 2A. As shown in FIG. 7A, in this preferred embodiment, a cover 20 for covering the slot 4 is provided. The cover 20 is formed of, for example, a plate formed of an electrically conducting material or an insulating material such as resin. One end of the cover 20 is a fixed end mounted to an inner wall surface of a case side wall 30 of the CF card device 1, and the other end of the cover 20 is a free end. The cover 20 has a bent portion 21 which allows the cover 20 to function as an elastic member. The cover 20 covers the slot 4 as a result of the free end of the cover 20 being in contact with the inner wall surface of the front case surface 31 of the CF card device 1 and pushing against the inner wall surface by elastic force. Accordingly, dirt is prevented from entering the memory card holder 3 from the slot 4.

Figure 7B:
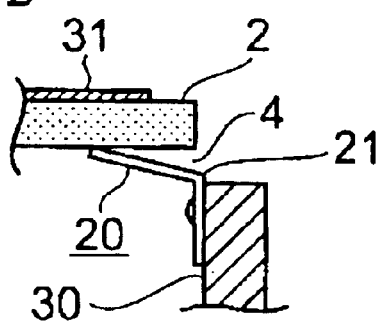

As shown in FIG. 7B, when the SIM card 2 is inserted into the slot 4, the pushing force from the SIM card 2 causes the cover 20 to be elastically deformed in an uncovering direction of the slot 4. This allows the SIM card 2 to be inserted into the memory card holder 3. At this time, the free end of the cover 20 pushes the SIM card 2, so that there are substantially no gaps between the SIM card 2 and the front case wall 31 and between the free end of the cover 20 and the SIM card 2. Therefore, dirt is prevented from entering the memory card holder 3 from the slot 4.

In the present preferred embodiment, the opening 10 formed in the CF card device 1 for externally operating the pushing-out member 6 is always covered by the pushing-out member 6 from the inside. In other words, the pushing-out member 6 and the operation opening 10 have appropriate sizes so that the pushing-out member 6 covers the operation opening 10 from the inside of the CF card device 1 when the SIM card 2 is at the set accommodation position and the pushing-out member 6 is in its most retreated state as shown in FIGS. 1B and 2A, and when the SIM card 2 is at the set pushed-out position and the pushing-out member 6 is in its most forwardly moved state as shown in FIGS. 1C and 2B. Therefore, it is possible to prevent entry of dirt into the pushing-out member holder 5 from the operation opening 10.

As described above, in this preferred embodiment, the operation opening 10 and the slot 4 communicating with the memory card holder 3 and the pushing-out member holder 5 are provided in the CF card device 1. The slot 4 and the operation opening 10 are always covered from the inside by the cover 20 and the pushing-out member 6, respectively. Therefore, it is possible to prevent the entry of dirt into the memory card holder 3 and the pushing-out member holder 5 from the exterior.

The present invention is not limited to the structural features of the above described preferred embodiments, so that various other forms are possible. For example, as shown in FIG. 8A, a protrusion 22 may be provided on a portion of the pushing-out member 6 that comes into contact with the SIM card 2. The protrusion 22 preferably has a shape which allows it to fit into a cutout 23 (shown in FIG. 3) in an insertion end of the SIM card 2. When the pushing-out member 6 has the protrusion 22, and the correct side of the SIM card 2 is inserted into the memory card holder 3, as shown in FIG. 8A, the protrusion 22 fits into the cutout 23 in the SIM card 2, so that the SIM card 2 is inserted to the set accommodation position without being impeded by the protrusion 22. In contrast, when the wrong side of the SIM card 2 is accidentally inserted into the memory card holder 3, as shown in FIG. 8B, an end of the protrusion 22 comes into contact with an end of the SIM card 2. Therefore, before the SIM card 2 reaches the set accommodation position, the insertion of the SIM card 2 is impeded. Consequently, when the insertion of the SIM card 2 is stopped, a portion of the SIM card 2 protrudes from the CF card device 1, so that the operator can realize that the wrong side of the SIM card 2 is inserted.

Figure 9A:
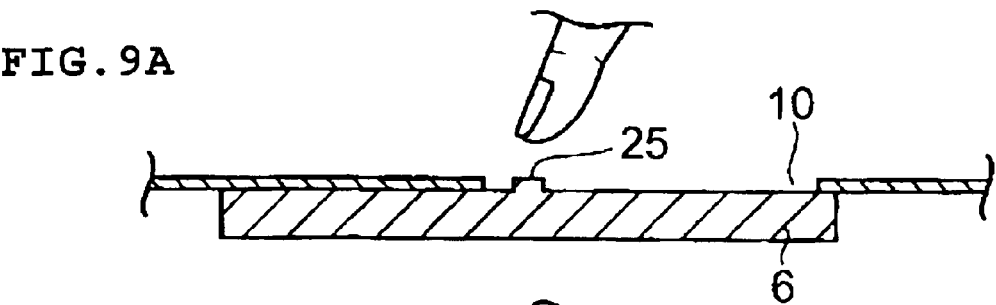
FIGS. 9A and 9B illustrate examples of an operation portion and operation portions of the pushing-out member.
Figure 9B:
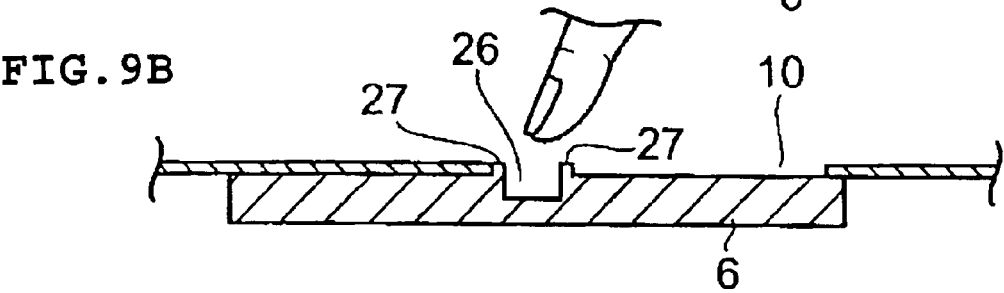

Although, in the above described preferred embodiments, the recess 12 is preferably disposed as the operation portion of the pushing-out member 6 in the surface of the pushing-out member 6 that is exposed from the operation opening 10, the present invention is not limited thereto. In place of the recess 12, for example, a protrusion 25 shown in the sectional view of FIG. 9A may be disposed as the operation portion of the pushing-out member 6, or a recess 26 and a protrusion 27 shown in the sectional view of FIG. 9B may be disposed as operation portions of the pushing-out member 6. In addition, the surface of the pushing-out member 6 that is exposed from the operation opening 10 may be flat in order to move the pushing-out member 6 by friction. When the pushing-out member 6 is moved by friction, in order to increase friction force between, for example, a finger and the surface of the pushing member 6, the surface of the pushing-out member 6 may be rough.

Figure 10:
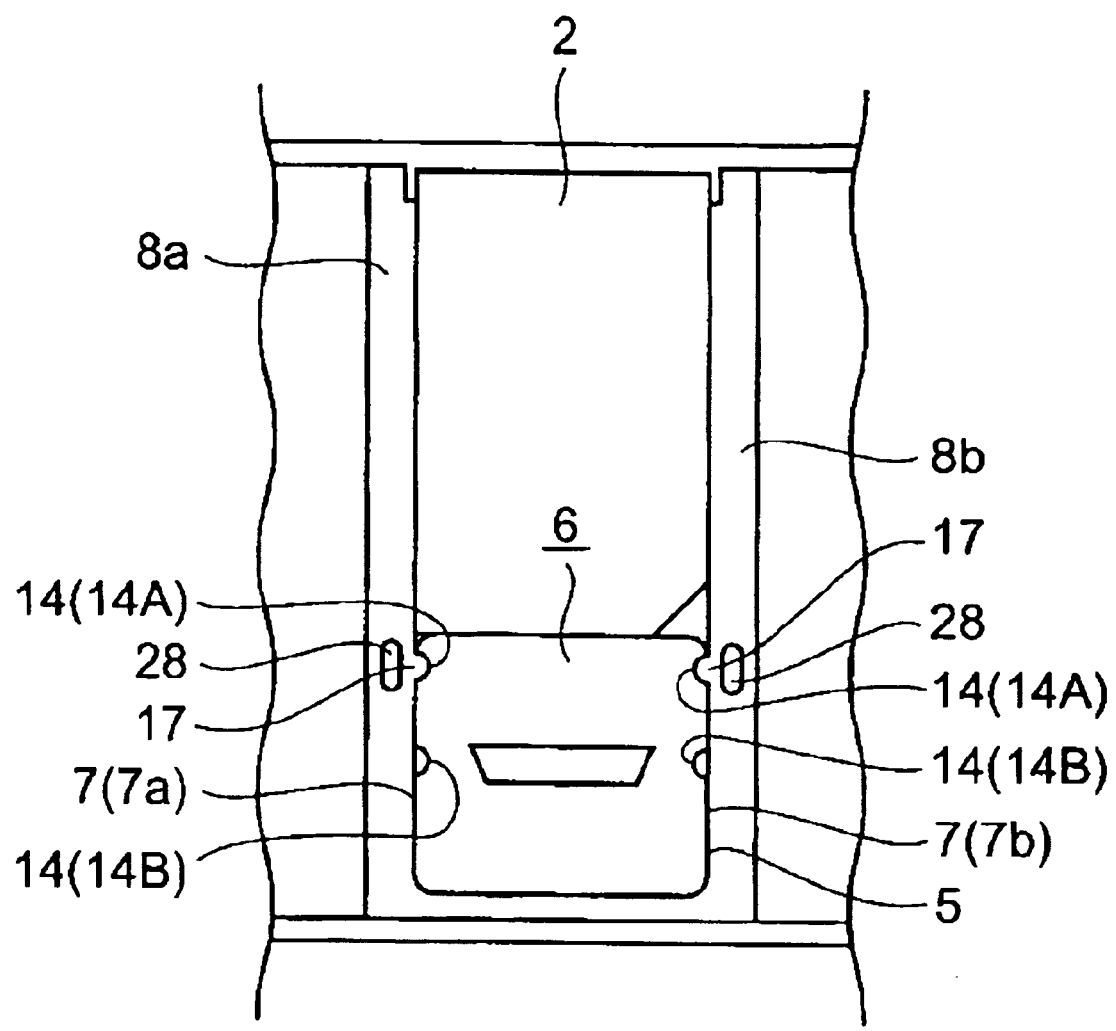
FIG. 10 illustrates an example of fitting portions of the pushing-out member and an example of fitting portions of the side surfaces of the first guide or pushing-out member holder.

Although, in the above described preferred embodiments, the fitting portions 14 of the pushing-out member 6 are preferably protrusions, and the fitting portions 17 of the side surfaces 7 are preferably recesses, for example, as shown in FIG. 10, the fitting portions 14 of the pushing-out member 6 may be recesses, and the fitting portions 17 of the side surfaces 7 may be protrusions.

Although, in the above described preferred embodiments, two fitting portions 14 each are preferably disposed on both sides of the pushing-out member 6, and four fitting portions 17 each are disposed in the side surfaces 7a and 7b, the number of fitting portions 14 of the pushing-out member 6 and the number of fitting portions 17 of the side surfaces 7 are not limited thereto. For example, in the example shown in FIG. 10, two fitting portions (recesses) 14 each are disposed in both sides of the pushing-out member 6, and one fitting portion (protrusion) 17 each is disposed on the side surfaces 7a and 7b.

In the example shown in FIG. 10, the positions of the fitting portions 14A and 14B are set so that the positions of the fitting portions 14A of the pushing-out member 6 when the SIM card 2 is inserted to the set accommodation position are the same as the positions of the fitting portions 14B of the pushing-out member 6 when the SIM card 2 is pushed to the set pushed-out position. In addition, the positions of the fitting portions 17 of the respective side surfaces 7 are set so that they are fitted to the respective fitting portions 14A of the pushing-out member 6 when the insertion of the SIM card 2 is completed and so that they are fitted to the fitting portions 14B of the pushing-out member 6 when the pushing out of the SIM card 2 is completed.

Although, in the above described preferred embodiments, the flexible portions are provided at the pushing-out member 6, the present invention is not limited thereto. For example, the flexible portions may be provided at the side surfaces 7 instead of at the pushing-out member 6. For example, in the example shown in FIG. 10, portions of the side surfaces 7 where the fitting portions 17 are provided may be formed as flexible portions by holes 28 disposed in the rails 8a and 8b (including the side surfaces 7) near the fitting portions 17. This means that the pushing-out member 6 slides while deforming the flexible portions of the side surfaces 7.

Figure 11:
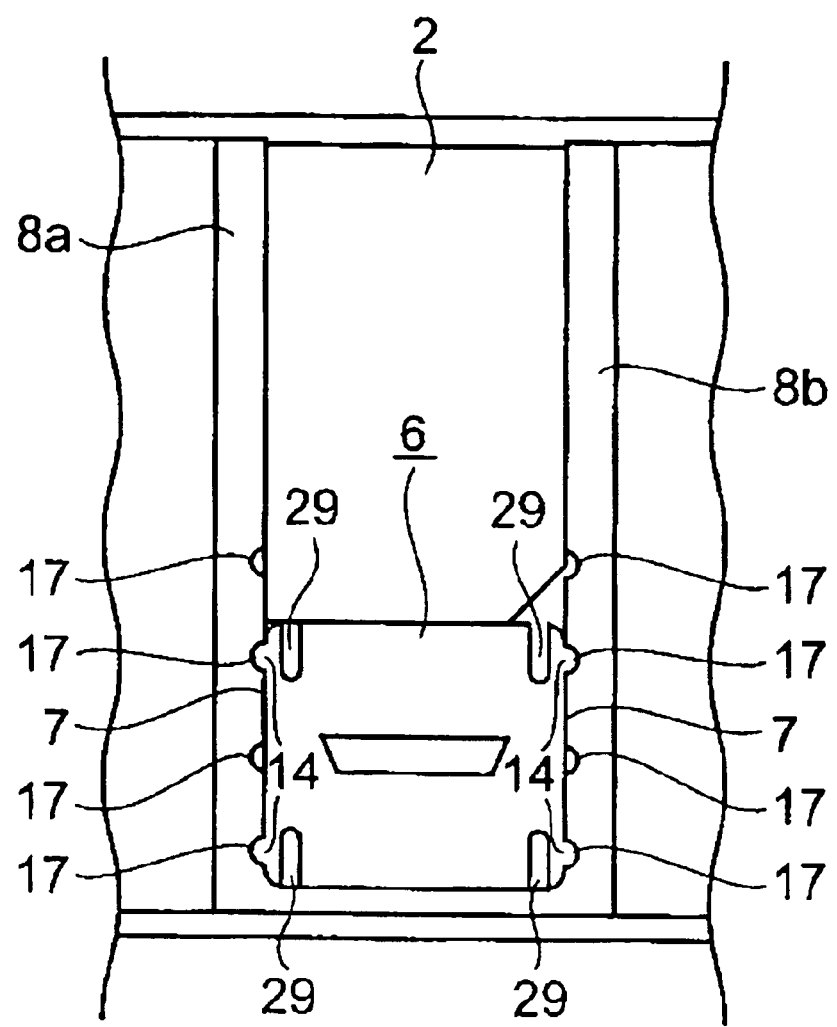
FIG. 11 illustrates an example of a structure for deforming sides of the pushing-out member.

Although, in the above described preferred embodiments, the flexible portions are preferably formed by disposing the through holes 15 in the pushing-out member 6, the present invention is not limited thereto. For example, as shown in FIG. 11, the portions of the pushing-out member 6 where the fitting portions are formed may be formed as flexible portions by disposing cutouts 29 in the pushing member 6.

Figure 13A:
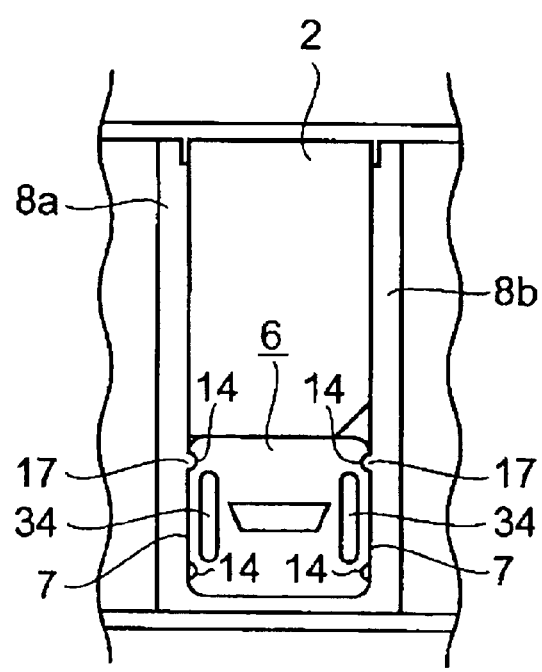
FIGS. 13A and 13B illustrate another example which is different from that shown in FIGS. 12A and 12B in which flexible portions are formed at the sides of the pushing-out member whose fitting portions are recesses.

Although, in the above described preferred embodiments, the flexible portions are formed at the pushing-out member 6 or the side surfaces 7 whose fitting portions are protrusions, the present invention is not limited thereto. For example, the flexible portions may be disposed at the pushing-out member 6 or the side surfaces 7 whose fitting portions are recesses. Specific examples are shown in FIGS. 12A and 13A, respectively. In the example shown in FIG. 12A, one protrusion (fitting portion) 14 each is disposed on both sides of the pushing-out member 6, and recesses (fitting portions) 17 (17o and 17i) are disposed in the respective side surfaces 7a and 7b. The fitting portions 17i are disposed at positions that allow them to fit the respective fitting portions 14 on the pushing-out member 6 when the SIM card 2 is disposed at the set accommodation position, and the fitting portions 17o are disposed at positions that allow them to fit to the respective fitting portions 14 on the pushing-out member 6 when the SIM card 2 is pushed to the set pushed-out position. In the example shown in FIG. 12A, the flexible portions are preferably formed by holes 33 at the side surfaces 7 whose fitting portions 17 are recesses. In this case, as shown in FIG. 12B, the pushing-out member 6 slides while the flexible portions of the side surfaces 7 are deformed by the fitting portions (protrusions) 14.

Figure 13B:
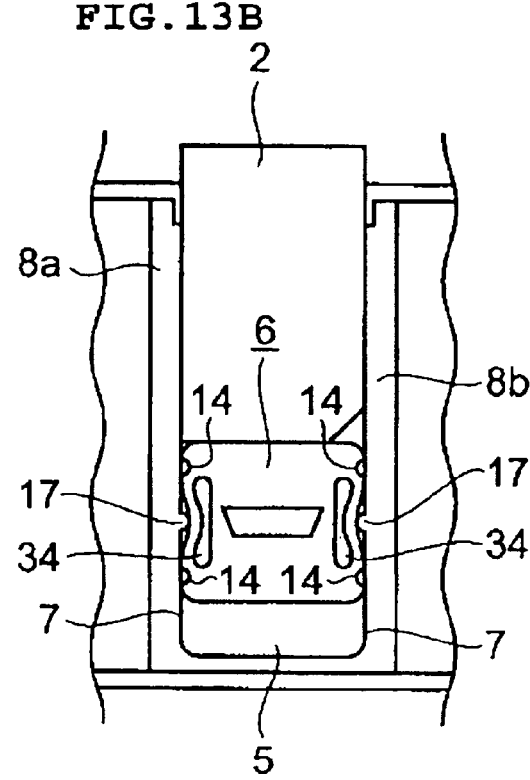

FIG. 13A shows a modification of the structure shown in FIG. 10. In the example shown in FIG. 13A, the fitting portions 14 on the pushing-out member 6 and the fitting portions 17 in the side surfaces 7 have similar structures to those in the example shown in FIG. 10. In the example shown in FIG. 13A, the flexible portions are formed by holes 34 at the pushing-out member 6 whose fitting portions 14 are recesses. In this case, as shown in FIG. 13B, the pushing-out member 6 slides while the flexible portions are deformed by the pushing force from the fitting portions (protrusions) 17 of the side surfaces 7.

Figure 14:
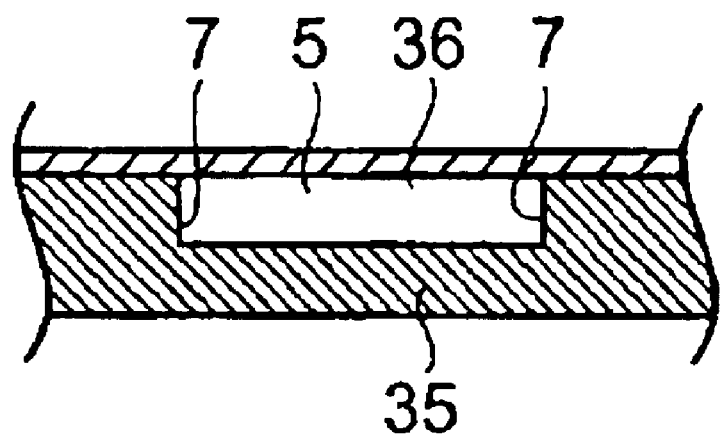
FIG. 14 is a sectional view of another example of the side surfaces of the pushing-out member holder.

Although, in the above described preferred embodiments, the side surfaces 7 are preferably defined by the rails 8a and 8b, the present invention is not limited thereto. For example, as shown in the sectional view of FIG. 14, the side surfaces 7 may be defined by inner wall surfaces defining a recess 36 formed as the pushing-out member holder in a plate 35.

Figure 15:
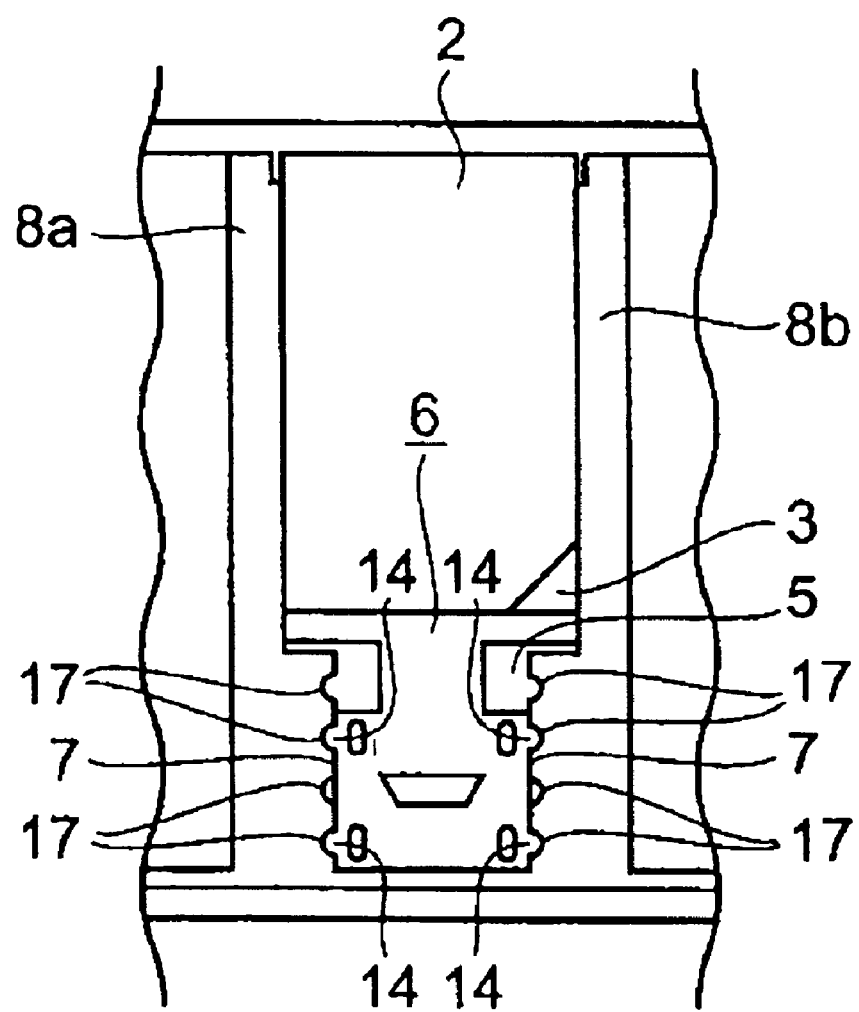
FIG. 15 illustrates an example in which side wall surfaces of a memory card holder and the side surfaces of the pushing-out member holder are not flush with each other.
Figure 16:
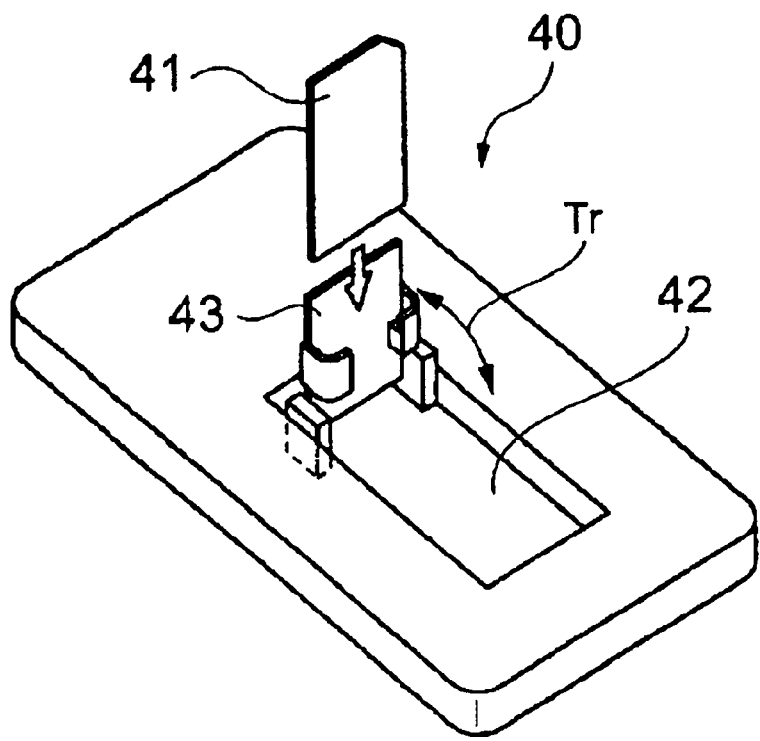
FIG. 16 shows a model of a related memory card insertion/removing mechanism in simplified form.

Although, in the above described preferred embodiments, the pushing-out member 6 is preferably substantially square-shaped, it may have, for example, a shape such as that shown in FIG. 15. The pushing-out member 6 may have any suitable shape depending upon, for example, the shape of the memory card holder 3 and the pushing-out member holder 5.

Although, in the above described preferred embodiments, the side wall surfaces of the memory card holder 3 and the side wall surfaces of the pushing-out member holder 5 are flush with each other, they do not have to be flush with each other as shown in, for example, FIG. 15.

Although, in the above described preferred embodiments, for example, as shown in FIG. 6A, the side surfaces 7 have the fitting portions 17 (17i) which face the respective fitting portions 14 of the pushing-out member 6 when the SIM card 2 is set at the set accommodation position, and have the fitting portions 17 (17o) which faces the respective fitting portions 14 of the pushing-out member 6 when the SIM card 2 is pushed out to the set pushed-out position, the present invention is not limited thereto. For example, like the side surfaces 7 having the fitting portions shown in FIG. 10, the side surfaces 7 may have common fitting portions 17 that fit the fitting portions 14 of the pushing-out member 6 when the SIM card 2 is at the set accommodation position and when it is at the set pushed-out position. Therefore, the fitting portions 17*i* used when the SIM card 2 is at the accommodation position and the fitting portions 17*o* used when the SIM card 2 is at the pushed-out position do not have to be separately provided.

Although, in the above described preferred embodiments, the pushing-out member 6 slides by being guided along the side surfaces 7, the present invention is not limited thereto. For example, the pushing-out member 6 may roll by a roller disposed at the pushing-out member 6 or the side surfaces 7 while being guided along the side surfaces 7.

Although, in the above described preferred embodiments, since the SIM card 2 and the pushing-out member 6 preferably have substantially the same thicknesses, the wall surfaces of the pushing-out member holder 5 facing the respective front and back of the pushing-out member 6 are formed continuously and are flush with the respective card guides of the memory card holder 3, the present invention is not limited thereto. For example, when the pushing-out member 6 and the SIM card 2 have different thicknesses, and the space between the wall surface facing the front of the pushing-out member 6 and the wall surface facing the back of the pushing-out member 6 preferably has a size in accordance with the thickness of the pushing-out member 6, only either one of the wall surface facing the front of the pushing-out member 6 and the wall surface facing the back of the pushing-out member 6 is formed continuously and flush with the card guide of the memory card holder 3.

Although, in the above described embodiments, a SIM card is given as an example of the memory card, and a CF card device is given as an example of the device for removably accommodating the SIM card, the present invention is not limited thereto. For example, the present invention may be applied to various other devices, such as PC card devices and cellular phones, which can removably accommodate a memory card. Various cards other than a SIM card, such as a secure-digital (SD) card, may be used as a memory card, so that the present invention may be applied to devices capable of removably accommodating a memory card other than a SIM card.

Although, in the above described preferred embodiments, a circuit is provided in the device for accommodating a memory card, the present invention is not limited thereto. For example, the present invention may be applied to a holder (adapter) designed specifically for accommodating a memory card. The holder may or may not be provided with connection terminals T' for contact connection with the terminals T on the memory card when the memory card is accommodated. When the connection terminals T' are provided, for example, an electrostatic discharging device is disposed in the holder, and the connection terminals T' are brought into contact with and connected to the electrostatic discharging device through a wiring pattern. In this case, by inserting and mounting the memory card in and to the holder, the memory card is brought into electrical conduction with the electrostatic discharging device of the holder, thereby preventing electrostatic discharge damage.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A device with a memory card insertion/removing mechanism, the device comprising:

a slot disposed in the device;

a memory card holder, disposed in the device, for accommodating a memory card inserted through the slot to the memory card holder;

a pushing-out member holder, disposed in the device;

a pushing-out member accommodated in the pushing-out member holder and movable in a card insertion direction and a card removing direction along a first guide defined by the pushing-out member holder, the pushing-out member holder communicating with a back side, as viewed in the card insertion direction, of the memory card holder; and an operation opening disposed in the device and exposing a portion of the pushing-out member to an exterior of the device, wherein the pushing-out member is moved in the card insertion direction by a pushing force exerted by the memory card when the memory card is inserted into the slot of the device, and pushes out the memory card accommodated in the memory card holder by an external operation through the operation opening;

the memory card holder functions as a second guide for guiding the memory card such that one of two surfaces of the memory card holder faces at least one of two surfaces of the memory card;

the first guide has a top surface and a bottom surface and side surfaces therebetween, one of the top and bottom surfaces of the first guide being arranged continuously and flush with one of the two surfaces of the second guide, the side surfaces of the first guide guiding sides of the pushing-out member;

said pushing-out member has a thickness that is substantially equal to a thickness of the memory card, and upper and lower surfaces of the pushing-out member are substantially planar with upper and lower surfaces of the memory card when said memory card is disposed in said memory card holder; and said pushing-out member is disposed adjacent to the memory card such that the pushing-out member is not superimposed on the memory card when said memory card is disposed in said memory card holder.

2. A device with a memory card insertion/removing mechanism according to claim 1, wherein a side of the pushing-out member facing one of the side surfaces of the first guide has a flexible portion which is deformed in a pushing direction by a pushing force exerted by the one of the side surfaces of the first guide and has a fitting portion including a recess or a protrusion, the one of the side surfaces of the first guide has two fitting portions which fit the fitting portion of the pushing-out member, one of the fitting portions of the one of the side surfaces of the first guide faces the fitting portion of the pushing-out member when the memory card is inserted to a predetermined accommodation position in the memory card holder and the other one of the fitting portions of the one of the side surfaces of the first guide faces the fitting portion of the pushing-out member when the memory card is pushed out to a predetermined pushed-out position, and the pushing-out member moves while the flexible portion is deformed by the pushing force from the one of the side surfaces of the first guide.

3. A device with a memory card insertion/removing mechanism according to claim 1, wherein a flexible portion is disposed at at least one of the side surfaces of the first guide, the flexible portion is deformed by a pushing force exerted by the pushing-out member, and the pushing-out member moves while deforming the flexible portion of said at least one of the side surfaces of the first guide.

4. A device with a memory card insertion/removing mechanism according to claim 1, wherein a surface of the pushing-out member exposed to the exterior of the device from the operation opening has at least one of a protrusion and a recess functioning as an operation portion of the pushing-out member.

5. A device with a memory card insertion/removing mechanism according to claim 1, wherein a portion of the pushing-out member coming into contact with a memory card which has a cutout at a front insertion end has a protrusion fitting the cutout of the memory card.

6. A device with a memory card insertion/removing mechanism according to claim 1, wherein a width of the slot and a width of the memory card holder are substantially equal to a width of the memory card.

7. A device with a memory card insertion/removing mechanism according to claim 1, wherein a height of the memory card holder and a height of the slot are substantially equal to a thickness of the memory card.

8. A device with a memory card insertion/removing mechanism according to claim 1, wherein the memory card is a subscriber-identity-modulus card.

9. A device with a memory card insertion/removing mechanism according to claim 1, further comprising a front case wall having a portion defining the pushing-out member holder and the memory card holder includes a card guide for guiding the memory card, wherein the portion of the front case wall defining the pushing-out member holder is arranged to be continuous and flush with the card guide of the memory card holder.

10. A device with a memory card insertion/removing mechanism according to claim 1, wherein the pushing-out member includes a protrusion for contacting the memory card.

11. A device with a memory card insertion/removing mechanism according to claim 1, further comprising a cover for covering the slot.

12. A device with a memory card insertion/removing mechanism according to claim 11, wherein the cover is an elastic member.

13. A device with a memory card insertion/removing mechanism according to claim 1, wherein the device is an external card device used for an electronic apparatus.

14. A device according to claim 13, wherein the external card device is a CompactFlash® card device.

15. A device with a memory card insertion/removing mechanism according to claim 1, further comprising a front case wall and a circuit board disposed in the device, wherein the memory card is guided along a surface of the circuit board and along a surface of the front case wall.

16. A device with a memory card insertion/removing mechanism according to claim 15, wherein the circuit board has connection terminals arranged to electrically contact terminals on the memory card.

17. A device with a memory card insertion/removing mechanism according to claim 15, wherein the memory card holder includes a card guide for guiding the memory card, and a portion of the circuit board defines the pushing-out member holder and is arranged to be continuous and flush with card guide of the memory card holder.

18. A device with a memory card insertion/removing mechanism according to claim 15, wherein the pushing-out member holder is defined by a portion of the front case wall.

19. A device with a memory card insertion/removing mechanism, the device comprising:
  a case including a front case wall;
  a slot disposed in a side of the case;
  a circuit board disposed in the case;
  a memory card holder, disposed in the device, for accommodating a memory card inserted through the slot to the memory card holder;
  a pushing-out member accommodated in the case and movable in a card insertion direction and a card removing direction; and
  an opening in a top surface of the case and exposing a portion of the pushing-out member to an exterior of the device, wherein
  the pushing-out member is moved in the card insertion direction by a pushing force exerted by the memory card when the memory card is inserted into the slot of the device, and pushes out the memory card accommodated in the memory card holder by an external operation performed via the operation opening such that the memory card is guided along a surface of the front case wall and a surface of the circuit board;
  the memory card holder functions as a first guide for guiding the memory card such that one of two surfaces of the memory card holder faces at least one of two surfaces of the memory card;
  a second guide for guiding the memory card has a top surface and a bottom surface and side surfaces therebetween, one of the top and bottom surfaces of the second guide being arranged continuously and flush with one of the two surfaces of the first guide, the side surfaces of the second guide guiding sides of the pushing-out members;
  said pushing-out member has a thickness that is substantially equal to a thickness of the memory card, and upper and lower surfaces of the pushing-out member are substantially planar with upper and lower surfaces of the memory card when said memory card is disposed in said memory card holder; and
  said pushing-out member is disposed adjacent to the memory card when said memory card is disposed in said memory card holder such that the pushing-out member is not superimposed on the memory card.

20. A device with a memory card insertion/removing mechanism according to claim 19, further comprising a pushing-out holding member provided in the device and accommodating the pushing-out member, wherein a portion of the pushing-out holding member defines the second guide.

21. A device with a memory card insertion/removing mechanism, the device comprising:
  a slot disposed in the device;
  a memory card holder, disposed in the device, for accommodating a memory card inserted through the slot to the memory card holder;
  a pushing-out member holder, disposed in the device;
  a pushing-out member accommodated in the pushing-out member holder and movable in a card insertion direction and a card removing direction along a first guide defined by the pushing-out member holder, the pushing-out member holder communicating with a back side, as viewed in the card insertion direction, of the memory card holder; and an operation opening disposed in the device and exposing a portion of the pushing-out member to an exterior of the device, wherein the pushing-out member is moved in the card insertion direction by a pushing force exerted by the memory card when the memory card is inserted into the slot of the device, and pushes out the memory card accommodated in the memory card holder by an external operation through the operation opening;

the memory card holder functions as a second guide for guiding the memory card such that one of two surfaces of the memory card holder faces at least one of two surfaces of the memory card;

the first guide has a top surface and a bottom surface and side surfaces therebetween, one of the top and bottom surfaces of the first guide being arranged continuously and flush with one of the two surfaces of the second guide, the side surfaces of the first guide guiding sides of the pushing-out member; and a side of the pushing-out member facing one of the side surfaces of the first guide has a flexible portion which is deformed in a pushing direction by a pushing force exerted by the one of the side surfaces of the first guide and has a fitting portion including a recess or a protrusion, the one of the side surfaces of the first guide has two fitting portions which fit the fitting portion of the pushing-out member, one of the fitting portions of the one of the side surfaces of the first guide faces the fitting portion of the pushing-out member when the memory card is inserted to a predetermined accommodation position in the memory card holder and the other one of the fitting portions of the one of the side surfaces of the first guide faces the fitting portion of the pushing-out member when the memory card is pushed out to a predetermined pushed-out position, and the pushing-out member moves while the flexible portion is deformed by the pushing force from the one of the side surfaces of the first guide.

22. A device with a memory card insertion/removing mechanism according to claim 21, wherein a surface of the pushing-out member exposed to the exterior of the device from the operation opening has at least one of a protrusion and a recess functioning as an operation portion of the pushing-out member.

23. A device with a memory card insertion/removing mechanism according to claim 21, wherein a portion of the pushing-out member coming into contact with a memory card which has a cutout at a front insertion end has a protrusion fitting the cutout of the memory card.

24. A device with a memory card insertion/removing mechanism according to claim 21, wherein the device is an external card device used for an electronic apparatus.

25. A device with a memory card insertion/removing mechanism, the device comprising:

a slot disposed in the device;

a memory card holder, disposed in the device, for accommodating a memory card inserted through the slot to the memory card holder;

a pushing-out member holder, disposed in the device;

a pushing-out member accommodated in the pushing-out member holder and movable in a card insertion direction and a card removing direction along a first guide defined by the pushing-out member holder, the pushing-out member holder communicating with a back side, as viewed in the card insertion direction, of the memory card holder; and an operation opening disposed in the device and exposing a portion of the pushing-out member to an exterior of the device, wherein the pushing-out member is moved in the card insertion direction by a pushing force exerted by the memory card when the memory card is inserted into the slot of the device, and pushes out the memory card accommodated in the memory card holder by an external operation through the operation opening;

the memory card holder functions as a second guide for guiding the memory card such that one of two surfaces of the memory card holder faces at least one of two surfaces of the memory card;

the first guide has a top surface and a bottom surface and side surfaces therebetween, one of the top and bottom surfaces of the first guide being arranged continuously and flush with one of the two surfaces of the second guide, the side surfaces of the first guide guiding sides of the pushing-out member; and a flexible portion is disposed at at least one of the side surfaces of the first guide, the flexible portion is deformed by a pushing force exerted by the pushing-out member, and the pushing-out member moves while deforming the flexible portion of said at least one of the side surfaces of the first guide.

26. A device with a memory card insertion/removing mechanism according to claim 25, wherein a surface of the pushing-out member exposed to the exterior of the device from the operation opening has at least one of a protrusion and a recess functioning as an operation portion of the pushing-out member.

27. A device with a memory card insertion/removing mechanism according to claim 25, wherein a portion of the pushing-out member coming into contact with a memory card which has a cutout at a front insertion end has a protrusion fitting the cutout of the memory card.

28. A device with a memory card insertion/removing mechanism according to claim 25, wherein the device is an external card device used for an electronic apparatus.

* * * * *